James H. Park, III
James R. Redman
Wilton H. Leverett
INVENTORS

April 19, 1966

J. H. PARK III, ETAL 3,246,666

PIPE BALL TRANSFER DEVICE

Filed Dec. 12, 1963

James H. Park, III
James R. Redman
Wilton H. Leverett
INVENTORS

BY
ATTORNEYS

United States Patent Office 3,246,666
Patented Apr. 19, 1966

3,246,666
PIPE BALL TRANSFER DEVICE
James H. Park III, James R. Redmon, and Wilton H. Leverett, all of Houston, Tex., assignors to Maintenance Engineering Corporation, Houston, Tex., a corporation of Texas
Filed Dec. 12, 1963, Ser. No. 330,068
8 Claims. (Cl. 137—268)

The present invention relates to a device for launching and catching a ball or other object which is conducted through a pipe with the fluids therethrough.

Launching and catching devices have been used in the past to inject a device into a pipe line to separate different fluids flowing through the pipe line and in systems such as meter prover loops in which a ball is used as an indication of the flow of fluids past a certain point. Generally meter prover systems have been designed to connect a loop to a meter. The loop is provided with some means for indicating when a ball flows past an initial switch and a final switch. The volume of the loop between the initial switch and the final switch is a carefully calibrated volume. By recording the volume flowing through the meter during the time it takes a ball to flow the distance between switches the meter reading may be checked against the known loop volume. Many devices have been used for launching and catching a ball from a pipe. Some of such devices have involved the use of a complicated mechanical structure to push the ball or other device into the flow stream. Other devices have had special chambers for dropping the ball into a pipe after the inlet to the chamber has been closed and the outlet opened to the pipe. Other devices have had special vertical sumps for catching the ball. Still other devices have included a by-pass in a loop between the inlet and the outlet and a valve controlling the flow of the ball through the by-pass. Such prior devices do not always provide for the removal or replacement of the ball and they have generally required a multiplicity of moving parts to launch and catch a ball.

Therefore an object of the present invention is to provide a ball transfer device having a single moving part which will launch, catch and remove a ball from a fluid flow line.

Another object of the present invention is to provide a ball transfer device having three positions, one for launching, a second for catching and a third for removal and replacement of a ball from a fluid flow line.

A further object of the present invention is to provide an improved ball transfer device which may be positioned horizontally, vertically or at any angle dictated by the related equipment without affecting the launching or catching of a ball.

A still further object of the present invention is to provide an improved pipe ball transfer device having components which are readily available and of simple construction.

Still another object of the present invention is to provide a pipe ball transfer device which is actuated by hydraulic pressure in one direction and by the pressure of fluids flowing through a pipe to which the device is connected in the other direction.

Another object of the present invention is to provide an improved pipe ball transfer device in which fluid flow through the device is unrestricted and therefore does not accumulate foreign materials.

These and other objects of the present invention are hereinafter more fully explained and described with reference to the drawings wherein:

FIGURE 2 is a sectional view of the pipe ball transfer device of the present invention in which the section is taken on the longitudinal centerline of the device.

Figure 1:
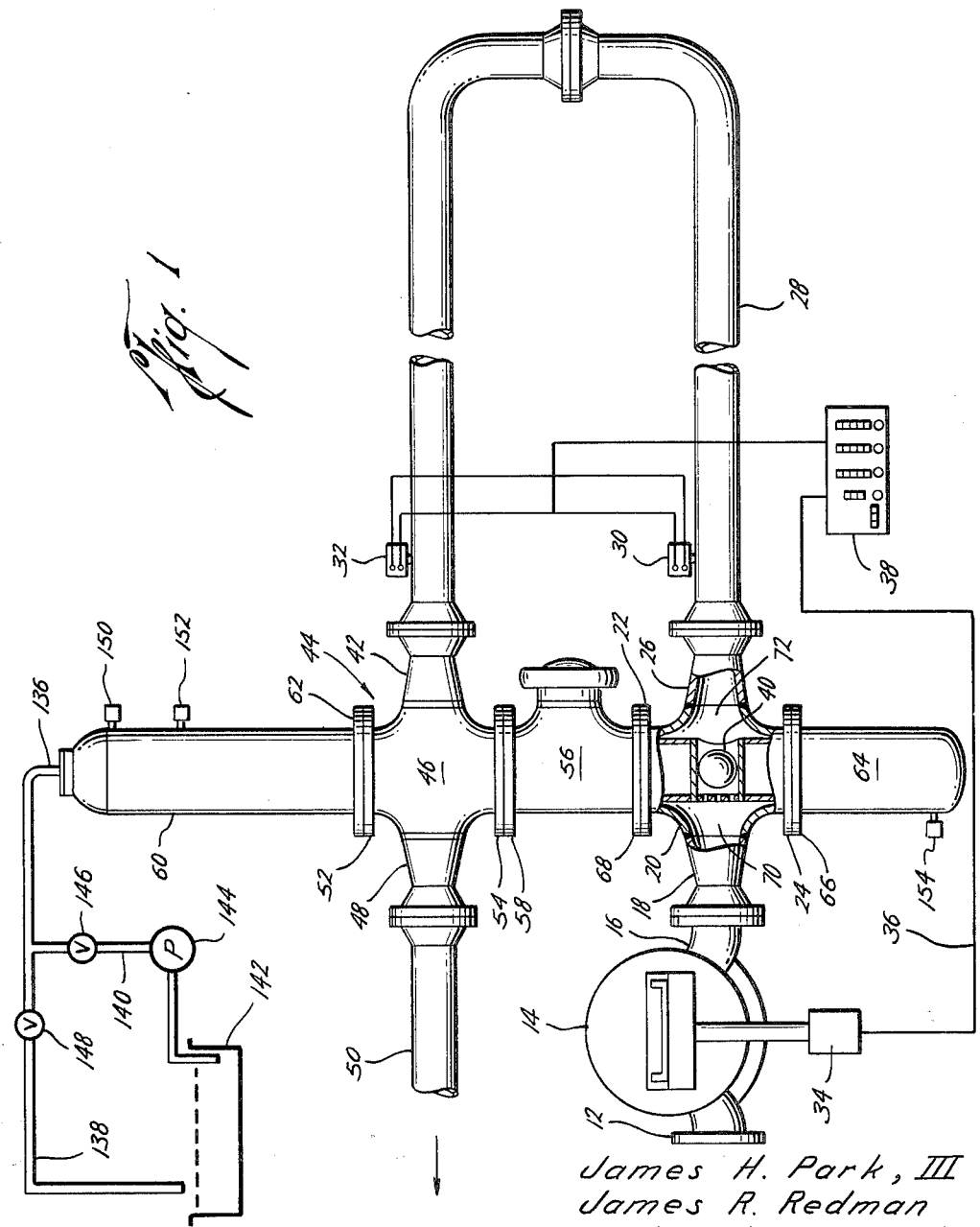
FIGURE 1 is an elevation view of a meter prover loop showing the connection of the pipe ball transfer device of the present invention installed in such loop.

Referring more in detail to the meter prover loop in FIGURE 1, the fluid inlet 12 of meter 14 is flanged to provide connection to a pipe whose flowing contents are to be metered. Usually such meters are liquid volume meters but the present invention has application to any type of fluid flow whether it be gas, liquid or a combination of gas and liquid where it is desired to either launch a ball or other device into the line or to catch a ball or other device and remove it from the line.

Meter outlet 16 is connected through conical pipe section 18 into one leg of pipe cross 20. Pipe cross 20 is provided with flanges 22 and 24 on its upper and lower legs and with conical pipe section 26 connecting into prover loop 28 by suitable flanged connections.

Meter loop 28 is similar to meter loops which have been used previously and may be of any form. As shown in FIGURE 1 meter loop 28 is provided with initial switch 30 and final switch 32 which are connected into the interior of loop 28 to sense when a ball passes their particular point of installation. The volume of loop 28 between switches 30 and 32 is a known, carefully calibrated volume. Meter 14 is provided with pulse generating tachometer 34 which is operated by the meter register and is connected to conduct output pulses through line 36 to electronic counter 38 which are directly proportional to the fluid flow through meter 14. Switches 30 and 32 are interconnected and are connected to electronic counter 38.

In operation a ball 40 is launched from cross 20 into conical pipe section 26. As ball 40 passes switch 30, it actuates switch 30 which will make a circuit to cause counter 38 to commence to register the pulses received from pulse generating tachometer 34. The flow of ball 40 through loop 28 is solely responsive to the flow of fluids therethrough. Ball 40 should be of sufficient size in relation to the inner diameter of pipe loop 28 that no fluid may pass around ball 40 once it has entered pipe loop 28 and therefore it will flow through loop 28 at the same velocity as the flow of fluids therethrough. With the continued flow of fluids and ball 40 through pipe loop 28 ball 40 will actuate switch 32 whereby the circuit to counter 38 will be broken and the registering of pulses from tachometer 34 will cease. Thus, counter 38 will have registered all of the pulses from tachometer 34 during the time taken for ball 40 to flow through loop 28 from switch 30 to switch 32. Since the volume of loop 28 between switches 30 and 32 is a known, accurately calibrated volume then the register of counter 38 can be checked to determine what volume was actually sensed by meter 14. This comparison may be used for checking the accuracy of meter 14 and may also be used for determining correction factors to be applied to the total readings of meter 14. The uses of such meter prover loops are believed to be well known.

Ball 40 after passing switch 32 will move through conical pipe section 42 and will be caught and removed from the flow line by transfer device 44 as hereinafter more fully described and explained. The fluid flow continues through cross 46 and conical pipe section 48 and is discharged from the meter prover loop system through outlet 50.

Cross 46 is provided with suitable flanges 52 and 54 at its upper and lower ends and is connected to T 56 at its lower end by flanges 54 and 58 and to upper cylinder section 60 at its upper end by flanges 52 and 62. The lower end of cross 20 is connected to lower cylinder section 64 by flanges 24 and 66 and the upper end of cross 20 is connected to T 56 by flanges 22 and 68.

Ball transfer device 44 of the present invention is shown in greater detail in FIGURE 2 and comprises the structure formed by crosses 20 and 46, T 56, upper cylinder section 60 and lower cylinder section 64. As shown in FIGURE 2 inlet 70 and outlet 72 to cross 20 and inlet 74 and outlet 76 to cross 46 are connected to straight sections of pipe and not conical sections as shown in FIGURE 1. The conical sections shown in FIGURE 1 are used to reduce the velocity of fluid flow through crosses 20 and 46 to eliminate turbulence and minimize the pressure drop therethrough. Selection of a preferred inlet and outlet configuration will therefore depend on the fluid velocity and either form may be used with the present invention. This difference in inlets and outlets is the only difference in the form of the transfer device 44 shown in the figures and therefore all other parts of the device have been given the same numeral designations.

With the components 60, 46, 56, 20 and 64 of transfer device 44 connected as shown the interior of such components comprises a cylinder in which tubular piston 78 is adapted to move. Bearing 80 is provided on the interior of cross 20 near its juncture with section 64. Bearing 82 is provided within cross 46 near its juncture with section 60 and bearing 84 is provided within section 60. Piston 78 is supported and moves within bearings 80, 82 and 84. Key 86 is secured to the exterior of piston 78 and bearings 84 and 82 are provided with slots 88 and 90 respectively, in which key 86 slides to preserve the orientation of piston with respect to inlets 70 and 74 and outlets 72 and 76.

As shown in the figures inlets 70 and 74 are in alignment with outlets 72 and 76 respectively. It is contemplated that this alignment of the inlets and outlets is not absolutely necessary provided that a fluid communication of sufficient size so as not to unnecessarily restrict the flow of fluids is provided between the respective inlets and outlets. Also, it should be noted that in the description and drawings transfer device 44 is shown in a vertical position with section 60 at the top and section 64 at the bottom. It is contemplated by the present invention that transfer device 44 may be installed horizontally or in a vertical position with section 60 at the bottom and section 64 at the top or transfer device 44 may be installed at any angle which may be dictated by the remainder of the equipment (such as the meter prover loop 28) with which transfer device is to be installed. The positioning of transfer device 44 will not in any way affect its operation as it will operate as well in the horizontal or slanted position as it will in a vertical position. The mention of certain parts being upper and lower is for mere convenience and as point of reference to the vertical installation shown in the figures. FIGURES 1 and 2 could have been designated to be plan views but for clarity of description have been designated as elevation views.

Packing glands 92 and 94 are provided around piston 78 at each end of T 56 whereby fluid pressure within cross 20 and within cross 46 will not flow into T 56. Packing glands 92 and 94 are supported on shoulders 92a and 94a on the interior of T 56 and packing followers 96 are spring loaded by springs 98 which are supported by plates 100. Plates 100 are positioned between flanges as shown.

Cover 102 is provided for the ball replacement opening of T 56 and is held in place by threaded coupling 104 or any suitable quick release means. O-ring 106 is provided between cover 102 and the end of ball replacement opening of T 56 whereby T 56 is completely sealed to prevent the leakage of any of the fluid which may be contained within T 56 when cover 102 is closed.

The lower end of piston 78 abuts plate 108 and ports 110 extend into the interior of piston 78 immediately above plate 108. Plate 108 is welded into the lower end of section 64 and provides a bottom stop for the downward movement of piston 78. Ball receiving chamber 112 is formed in piston 78 by plates 114 and 116 which are welded to the interior of piston in the positions shown in FIGURE 2 and plates 114 and 116 are spaced apart a sufficient distance to accommodate a ball, such as ball 40 shown in FIGURE 1. The inner diameter of piston 78 is of sufficient size to accommodate ball 40 in ball receiving chamber 112 without restricting the movement of ball 40 into or out of ball receiving chamber 112. Ports 118 extend through piston 78 into ball receiving chamber 112 on the side of piston 78 exposed to inlet 70. The opposite side of ball receiving chamber 112 is open to provide for the movement of a ball into and from ball receiving chamber. The opening is provided by cutting hole 120 in piston 78 between plates 114 and 116.

The upper end of section 60 is closed by head 122 in which fitting 124 is mounted. Tubular arm 126 depends from fitting 124 a sufficient distance to fit within the upper end of piston 78 when it is at its lowermost position as shown in FIGURE 2. Seal assembly 128 is secured to the end of arm 126 and contains resillient sealing members 130 and 132 which seal against the interior of piston 78. Hollow bushing 134 extends through seal member 128 and provides a communication between the interior of arm 126 and the interior of piston 78. Line 136 connects into fitting 124 and extends to return line 138 and supply line 140 as shown in FIGURE 1. Supply line 140 connects from hydraulic fluid reservoir 142 through pump 144 and valve 146 into line 136 and return line 138 connects from line 136 through valve 148 and discharges into reservoir 142. The foregoing hydraulic actuating system is shown schematically and may be any suitable form to provide a supply of hydraulic actuating fluid to line 136 and to return hydraulic fluid which is discharged through line 136.

Piston position indicating devices 150 and 152 are mounted on upper cylinder section 60 and piston position indicating device 154 is mounted in lower cylinder section 64. Devices 150, 152 and 154 are designed to provide an indication of the position of piston 78 to simplify the operation of transfer device 44. Any suitable device may be used which will provide such an indication. The devices shown are provided with finger 156 extending within transfer device 44 and connected through suitable packing or magnetic pickup to prevent leakage, to switch 158. Thus, when finger 156 is engaged by piston 78 it will move outwardly and actuate switch 158 to its on position indicating that piston 78 has reached the position of the particular indicating device. When device 154 is on, then ball receiving chamber 112 is positioned as shown in FIGURE 2. When device 152 first comes on, then piston 78 will be positioned so that ball receiving chamber 112 is positioned within T 56 and covered 102 may be removed to replace or insert a new ball. When both devices 150 and 152 are on, piston 78 will be in its upper position with ball receiving chamber 112 in alignment with inlet 74.

In operation ball transfer device 44 would first be hooked into the prover loop 28, the meter 14 and to the hydraulic supply system as shown in FIGURE 1. Ball receiving chamber 112 will be positioned between packing glands 92 and 94 so that hole 120 will register with the opening in T 56 when cover 102 is removed. Device 152 will indicate this position. Ball 40 is inserted into ball receiving chamber 112 and cover 102 is replaced and shut tight. With valve 148 closed and valve 146 open hydraulic fluid under pressure can then be supplied through line 136 and arm 128 into the interior of piston 78. This pressure will move piston 78 into position where ball receiving chamber 112 will be between inlet 70 and outlet 72. Indicating device 154 will show when piston 78 has reached this position. In this position the fluid flow through inlet 70 to outlet 72 will flow at least partly through ports 118 and ball receiving chamber 112 whereby ball 40 will be caused to move through outlet 72 and conical section 26 into prover loop 28. As ball 40 passes under switch 30 counter 38 will be actuated and commence counting the pulses received from pulse generating tachometer 34 and when ball 40 passes under switch 32 counter will be stopped so that the pulses counted which indicated the volume recorded by meter 14 may be compared with the known volume of loop 28 between switches 30 and 32. Ball 40 will continue to flow through conical section 42 and inlet 74 of cross 46. If piston 78 has not been moved then ball 40 will rest within inlet 74 against piston 78. Piston 78 is moved to its upper position whereby ball receiving chamber 112 will register with inlet 74 by closing valve 146 and opening valve 148 allowing the hydraulic fluid within piston 78 and arm 128 to return to reservoir. Movement of piston 78 will then be responsive to the fluid pressure within cross 20 since this pressure will be exerted upwardly and there is no counter balancing pressure being exerted downwardly either within cross 20 or within cross 46. Obviously, the fluid pressure within ball receiving chamber 112 is exerted in both directions and therefore does not provide any force for movement of piston 78. Bearing 80 is so constructed to allow fluid pressure within section 64 and this fluid pressure is transmitted through ports 110 into the interior of piston 78 whereby the force for movement of piston 78 to its uppermost position is attained. When ball receiving chamber 112 is moved across packing gland 92 a certain amount of pressure fluid will flow into T 56 and it is suggested that in applications of ball transfer device 44 to a meter prover system as shown in FIGURE 1 that piston 78 be held in its position until ball 40 has actuated switch 32 so as not to introduce any inaccuracy in the volume comparison since some of the fluid will be taken up in displacing piston 78 and some will be carried into T 56 as previously explained. With ball receiving chamber 112 in its uppermost position as indicated by indicating device 150, ball 40 will enter therein and the fluid flowing through cross 46 will be transmitted through ball receiving chamber 112 and out ports 118 and also will flow around piston 78 so that the flow is not obstructed. As soon as ball 40 is received it may be moved to T 56 for removal and replacement or it may be moved back into position to flow through loop 28 again.

If it is desired the hydraulic controls may be changed so that piston 78 is positively actuated in both directions by the hydraulic fluid. Connection of a hydraulic line through the end of section 64 and plate 108 would then transmit the hydraulic pressure to the interior of piston 78. Bearing 80 should then be provided with a seal so that hydraulic fluid will not enter cross 20 and comingle with the fluid flowing therethrough. In such an installation movement of piston 78 downward would be accomplished by connecting line 136 to pump 144 and the line from section 64 would be connected to return line 138. Upward movement of piston 78 would be accomplished by connecting pump 144 to the line from section 64 and line 136 would be connected to return line 138. Valving for such a system is relatively simple and may easily be included if positive actuation of piston 78 in both directions is desired.

The control of the position of piston 78 is maintained by the opening and closing of valves 146 and 148 in the hydraulic system illustrated in FIGURE 1. When it is desired that piston 78 move downwardly valve 148 will be closed and valve 146 will be opened and pump 144 will be started. To move piston 78 upwardly, pump 144 should be stopped, valve 146 closed and valve 148 opened to allow the hydraulic fluid to drain back into reservoir 142. If it is desired to stop piston so that ball receiving chamber 112 is within T 56 then it is necessary to move piston 78 in the direction toward T 56 and when the proper position is achieved both valves 146 and 148 are closed tightly so that the hydraulic fluid will be trapped in the system and prevent further movement of piston 78. In such position of ball receiving chamber 112 cover 102 may be removed and a ball inserted or removed from chamber 112.

The device of the present invention may be used in applications other than in conjunction with meter prover loops. For example, it may be used to launch or catch a ball or other device into a pipe line which is used to separate different grades of fluids flowing through the pipe line. In such application the pipe line will be connected to cross 20 at the point of launching and will be connected to cross 46 at the point of catching. Also, in such application it would not be necessary to provide cross 46 with an inlet and an outlet at the point of launching and to provide cross 20 with an inlet and an outlet at the point of catching so these connections may be closed with blind flanges or the crosses 20 or 46 may be exchanged for a pipe spool having the same internal configuration to accommodate piston 78 or the piston 78 may be shortened and the cross omitted since its travel will only have to be between one of the crosses and the central position within T 56. Such application is mentioned by way of illustration as being contemplated by the present invention but no limitation to the mentioned applications is intended since the pipe ball transfer device may be used in any application for the launching, catching and replacement of a ball into and from a pipe line.

From the foregoing it may be seen that a device has been provided for launching, removal and replacement of ball into and from a pipe line wherein the only moving part is the piston 78 that such device does not restrict the fluid flow therethrough, the device may be moved hydraulically from one position to another and may move in one direction responsive to the fluid pressure flowing in the pipe line to which the device is connected and the device is relatively simple in construction and operation with three positions, launching position, catching position and replacement position.

The foregoing disclosure and description of the invention is illustrative and explanatory thereof, and various changes in the size, shape and materials, as well as in the details of the illustrated construction, may be made within the scope of the appended claims without departing from the spirit of the invention.

We claim:
1. A pipe ball transfer device comprising,
   a structure having a transfer cylinder,
   a piston movable within said transfer cylinder,
   a first inlet connecting into said structure near one end of said cylinder,
   a first outlet connecting into said structure near said one end and on the opposite side of said structure from said first inlet,
   said cylinder being larger than said piston near said one end to provide a substantially unrestricted communication through said cylinder between said first inlet and said first outlet,
   a second inlet connecting into said structure near the opposite end of said cylinder,
   a second outlet connecting into said structure near said opposite end and on the opposite side of said structure from said second inlet,
   said cylinder being larger than said piston near said opposite end to provide a substantially unrestricted communication through said cylinder between said second inlet and said second outlet, a ball receiving means in said piston, and means for moving said piston in said cylinder to positively move a ball in said ball receiving means into communication with said first inlet and outlet in one position of said piston and into communication with said second inlet and outlet in another position of said piston to introduce a ball into one of said inlets and outlets and to pick up a ball from another one of said inlets and outlets with fluids flowing substantially unrestricted through said structure between each of said inlets and outlets.

2. A pipe ball transfer device comprising, a structure having a transfer cylinder, a piston movable within said transfer cylinder, a first inlet connecting into said structure near one end of said cylinder, a first outlet connecting into said structure near said one end and on the opposite side of said structure from said first inlet, said cylinder being larger than said piston near said one end to provide a substantially unrestricted communication through said cylinder between said first inlet and said first outlet, a second inlet connecting into said structure near the opposite end of said cylinder, a second outlet connecting into said structure near said opposite end and on the opposite side of said structure from said second inlet, said cylinder being larger than said piston near said opposite end to provide a substantially unrestricted communication through said cylinder between said second inlet and said second outlet, a ball receiving means in said piston, a ball replacement opening into said structure between said first and second inlets for inserting and removing a ball into said ball receiving means, a removable cover closing said opening, and means for moving said piston in said cylinder to move said ball receiving means into communication with said first inlet and outlet in a first position, into communication with said opening in a second position and into communication with said second inlet and outlet in a third position to introduce a ball into one of said inlets and outlets and to pick up a ball from another one of said inlets and outlets with fluids flowing substantially unrestricted through said structure between each of said inlets and outlets.

3. A pipe ball transfer device according to claim 1, including, sealing means surrounding said piston and sealing between the outer surface of said piston and the inner surface of said cylinder at a position between the connections of the first inlet and outlet and the second inlet and outlet to prevent flow through one of said inlets bypassing through said cylinder to the other outlet.

4. A pipe ball transfer device according to claim 1 wherein said ball receiving means comprises a chamber in said piston, an opening into said chamber of sufficient size to launch a ball into and receive a ball from one of said inlets and outlets, and flow passages through the wall defining the side of said chamber opposite said opening to allow a part of the fluids flowing from an inlet to an outlet to flow through said chamber when said chamber is in registry with one of said inlets or outlets to thereby move a ball from said chamber into one of said outlets and to move a ball into said chamber from one of said inlets responsive to such partial flow of fluids.

5. A pipe ball transfer device according to claim 1 wherein said moving means includes, an actuating chamber at one end of said cylinder, means for conducting a pressure fluid into said actuating chamber to be exerted against one end of said piston to urge said piston in a direction away from said actuating chamber, fluid communication means between the end of said piston opposite to said actuating chamber and the inlet and outlet nearest said opposite end of said piston to bias said piston in a direction toward said actuating chamber at all times by the pressure of fluids flowing through said inlet and outlet, and means controlling the pressure of fluids in said actuating chamber to move said piston to the desired positions.

6. A pipe ball transfer device according to claim 2 including a first sealing means surrounding said piston and sealing between said piston and said cylinder at a position between said first inlet and outlet and said ball replacement opening, and a second sealing means surrounding said piston and sealing between said piston and said cylinder at a position between said second inlet and outlet and said ball replacement opening so that the cover may be removed from said opening without shutting off fluid flow through said inlets and outlets.

7. A pipe ball transfer device comprising, a first cross member, one pair of opposite legs of said first cross member connecting to a first inlet and a first outlet, a T, the other pair of opposite legs of said first cross member connecting to a first cylinder member and an end leg of said T, means closing the unconnected end of said first cylinder member, a second cross member, one pair of opposite legs of said second cross member connecting to a second inlet and a second outlet, the other pair of opposite legs of said second cross member connecting a second cylinder member and the other end leg of said T, means closing the unconnected end of said second cylinder member, said T, said cross members and said cylinder members forming a transfer cylinder, a piston movable in said cylinder, said cylinder being larger than said piston to provide a substantially unrestricted communication between said first inlet and outlet and between said second inlet and outlet, a closure for the central leg of said T, seal means around said piston in said T above and below said central leg of said T to isolate said central leg from fluids flowing through said cross members, a ball receiving chamber in said piston, and means moving said piston to position said ball receiving chamber in registry with the central leg of said T for loading and unloading a ball, to position said chamber in registry with one of said outlets to launch a ball and to position said chamber in registry with one of said inlets to catch a ball.

8. A pipe ball transfer device comprising, a structure having a transfer cylinder, a piston movable within said transfer cylinder, an inlet connecting into said structure, an outlet connecting into said structure, said cylinder being larger than said piston near said inlet and outlet to provide a substantially unrestricted communication through said cylinder between said inlet and said outlet, a ball replacement opening into said structure spaced from said inlet and said outlet, means closing said opening, a ball receiving means in said piston, sealing means surrounding said piston to seal the communication between said inlet and outlet from said ball replacement opening, and means for moving said piston in said cylinder to move said ball receiving means into communication with said ball replacement opening in one position and into registry with one of said inlet and outlet in a second position for launching a ball into one of said inlet and outlet with fluids flowing substantially unrestricted through said communication between said inlet and said outlet.

References Cited by the Examiner

UNITED STATES PATENTS

| 3,063,079 | 11/1962 | Bergman et al. |
| 3,146,477 | 9/1964 | Bergman et al. |

FOREIGN PATENTS

| 309,344 | 4/1929 | Great Britain. |
| 936,646 | 9/1963 | Great Britain. |

MARTIN P. SCHWADRON, *Acting Primary Examiner.*